(12) United States Patent
Walpole et al.

(10) Patent No.: US 9,016,550 B2
(45) Date of Patent: Apr. 28, 2015

(54) FRICTION WELDING

(71) Applicant: Rolls-Royce PLC, London (GB)

(72) Inventors: Andrew Robert Walpole, Derby (GB); Daniel Clark, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 14/046,168

(22) Filed: Oct. 4, 2013

(65) Prior Publication Data

US 2014/0131426 A1    May 15, 2014

(30) Foreign Application Priority Data

Nov. 14, 2012 (GB) .................................. 1220462.4

(51) Int. Cl.
| | |
|---|---|
| *B23K 20/12* | (2006.01) |
| *C23C 4/08* | (2006.01) |
| *C23C 4/18* | (2006.01) |
| *C23C 28/02* | (2006.01) |

(52) U.S. Cl.
CPC ........... *B23K 20/1245* (2013.01); *B23K 20/125* (2013.01); *B23K 20/12* (2013.01); *B23K 20/122* (2013.01); *B23K 20/1255* (2013.01); *C23C 4/08* (2013.01); *C23C 4/18* (2013.01); *C23C 28/02* (2013.01)

(58) Field of Classification Search
CPC .. B23K 20/12; B23K 20/122; B23K 20/1225; B23K 20/125; B23K 20/1255
USPC ................................ 228/122.1, 113, 114, 2.1
See application file for complete search history.

(56) References Cited

U.S. PATENT DOCUMENTS

| | | | |
|---|---|---|---|
| 4,203,690 A | | 5/1980 | Tanaka et al. |
| 6,325,273 B1 * | | 12/2001 | Boon et al. ................. 228/112.1 |
| 2003/0047590 A1 * | | 3/2003 | Okamoto et al. ............. 228/127 |
| 2005/0159840 A1 * | | 7/2005 | Lin et al. ........................ 700/245 |
| 2009/0123778 A1 * | | 5/2009 | Russell et al. ................ 428/661 |
| 2010/0215912 A1 | | 8/2010 | Kubota et al. |
| 2010/0258612 A1 | | 10/2010 | Kolbeck et al. |
| 2011/0104515 A1 * | | 5/2011 | Kou et al. ...................... 428/649 |
| 2012/0248175 A1 * | | 10/2012 | Moriguchi et al. ......... 228/112.1 |

FOREIGN PATENT DOCUMENTS

| | | |
|---|---|---|
| FR | 2 540 767 A1 | 8/1984 |
| GB | 2 402 905 A | 12/2004 |
| GB | 2478480 A | 9/2011 |
| JP | A-2004-082144 | 3/2004 |
| JP | A-2010-194591 | 9/2010 |

OTHER PUBLICATIONS

Nov. 28, 2012 Search Report issued in British Application No. 1220462.4.
Mar. 14, 2014 European Search Report issued in European Patent Application No. 13 18 7378.

* cited by examiner

*Primary Examiner* — Erin Saad
(74) *Attorney, Agent, or Firm* — Oliff PLC

(57) ABSTRACT

A welding tool for friction welding a workpiece, the tool including: a probe having a core including a ceramic material, the probe having a surface coating including a metallic material covering at least part of a contact zone of the probe.

12 Claims, 2 Drawing Sheets

FRICTION WELDING

FIELD OF THE INVENTION

The present invention relates to a friction welding tool, a welding apparatus incorporating the tool, and a method of welding using the apparatus.

BACKGROUND TO THE INVENTION

Friction welding comprises using relative motion between a tool and a workpiece, or between first and second workpieces, to generate heat to plastically displace and fuse the material of the workpiece without melting the material of the workpiece. As the material of the workpiece is not melted, friction welding is known as a "solid state" welding method.

Several types of friction welding or known, including linear friction welding, rotational friction welding and friction stir welding (FSW).

In linear friction welding, the relative motion is a lateral oscillation between the first and second workpieces. In rotational friction welding, the relative motion is rotational between the first and second workpieces. In both lateral and rotational friction welding, the first and second workpieces are joined together at the end of the welding process.

In friction stir welding (FSW) a tool is rotated relative to the workpiece about an axis of the tool. The tool comprises a probe and a shoulder either side of the probe. During FSW, the tool is rotated about the tool's axis at high speed and is "plunged" into the material such that the probe extends beneath the surface of the material. The tool is then moved laterally along a join between two adjacent workpieces. Material in the workpieces adjacent a contact surface between the probe and the workpieces is heated, plasticised and mixed by contact with the tool in a "weld-zone". The weld zone advances along the workpieces to form a weld as the tool is moved along the join. In FSW, two adjacent workpieces are joined together, but the tool is generally removed at the end of the welding process. In FSW, it is desirable that the tool does not become part of the joined workpieces, since the tools are relatively expensive.

FSW has been used successfully for welding workpieces made of aluminium for example. However, FSW of some materials, such as titanium alloys has been found to be difficult, since tools suitable for other metals may fail when used for FSW of titanium, particularly during the plunge. The tool may be worn away such that the outer diameter of the probe is reduced, or may shatter.

One solution is to use a tool comprising a tungsten based alloy such as that described in UK patent application 2402905. However, such tools are relatively expensive, and are consumed (i.e. worn away, and possibly incorporated into the weld) by the welding process. It has been found that the length of material that can be welded before failure using such tools to weld titanium is of the order of 3 to 5 meters. If the tool fails before the weld is complete, the workpiece will generally have to be discarded, as the weld will generally have to be continuous in order to obtain the required strength. Since the tool is incorporated into the weld, the weld may not be as strong as the parent materials of the workpiece. There is therefore a requirement for a welding tool which can be made more cheaply, and which can achieve longer weld lengths, while resulting in a weld having close to the same strength as the parent material.

The present invention seeks to overcome some or all of the above problems.

SUMMARY OF THE INVENTION

According to a first aspect of the present invention, there is provided a friction welding tool comprising:

a probe comprising a ceramic material, the probe having a surface coating comprising a metallic material covering at least part of a contact zone of the probe.

Advantageously, the invention provides a welding tool which is substantially cheaper than prior welding tools suitable for certain materials, and which can achieve weld lengths greatly in excess of prior welding tools.

The skilled person would understand the term "metallic" to refer to materials having a relatively high thermal conductivity and high plasticity under high pressures and temperatures. The skilled person would understand the term "ceramic" to refer to inorganic non-metallic solids having a relatively low thermal conductivity.

The ceramic material may comprise any of silicon nitride ($Si_3N_4$), silicon carbide (SiC), sialon, ytrria, ceramic metal composite (Cermet), Ceramic composite and reinforced ceramic composite. Alumina and Silicon Nitride have been found to be particularly suitable for the welding of titanium workpieces.

The metallic coating is chemically compatible with the ceramic material. By "chemically compatible", the skilled person will understand that the metallic coating will not chemically react with the ceramic material of the probe in the environment, (e.g. at the temperatures and pressures) at which welding will typically take place.

The metallic coating has a thickness between 1 and 1000 microns. Preferably, the metallic coating has a thickness between 100 and 1000 microns.

The metallic coating may comprise a thermally conducting, malleable, ductile material. The metallic coating may comprise any of titanium, copper, nickel and steel.

The tool may comprise a shoulder having a coating comprising the metallic material. The shoulder may be integral with the probe, and may be configured to rotate with the probe in use. Alternatively, the shoulder may be separate, and the probe may be configured to rotate relative to the shoulder in use.

The metallic coating may be applied by a spray coating or a vacuum plasma spraying. The surface of the metallic coating may be polished to provide a smooth contact surface.

According to a second aspect of the invention there is provided a friction welding apparatus comprising a welding tool in accordance with the first aspect of the invention and a workpiece to be welded.

The workpiece may comprise any of titanium, nickel, steel, magnesium, aluminium, nickel and alloys thereof.

The metallic material may be chemically and physically compatible with a weld generated by the friction welding apparatus. By "physically compatible", the skilled person will understand that the material of the workpiece will not substantially interfere with the quality of the resulting weld when the metallic material comes into contact with and or is mixed with the material of the workpiece. Preferably, the metallic coating comprises the workpiece material.

According to a third aspect of the present invention, there is provided a method of friction welding a workpiece comprising:

providing a workpiece comprising a workpiece material;
providing a tool in accordance with the first aspect of the invention; and friction welding the workpiece using the tool.

The method may comprise any of friction stir welding, linear friction welding and rotational friction welding.

According to a fourth aspect of the invention, there is provided a workpiece welded using the method according to the third aspect of the invention.

DETAILED DESCRIPTION

Figure 1:
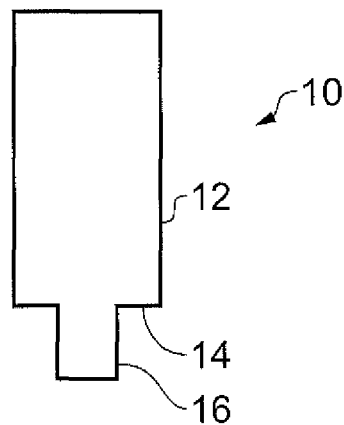
FIG. 1 shows a first friction stir welding tool.
Figure 3:
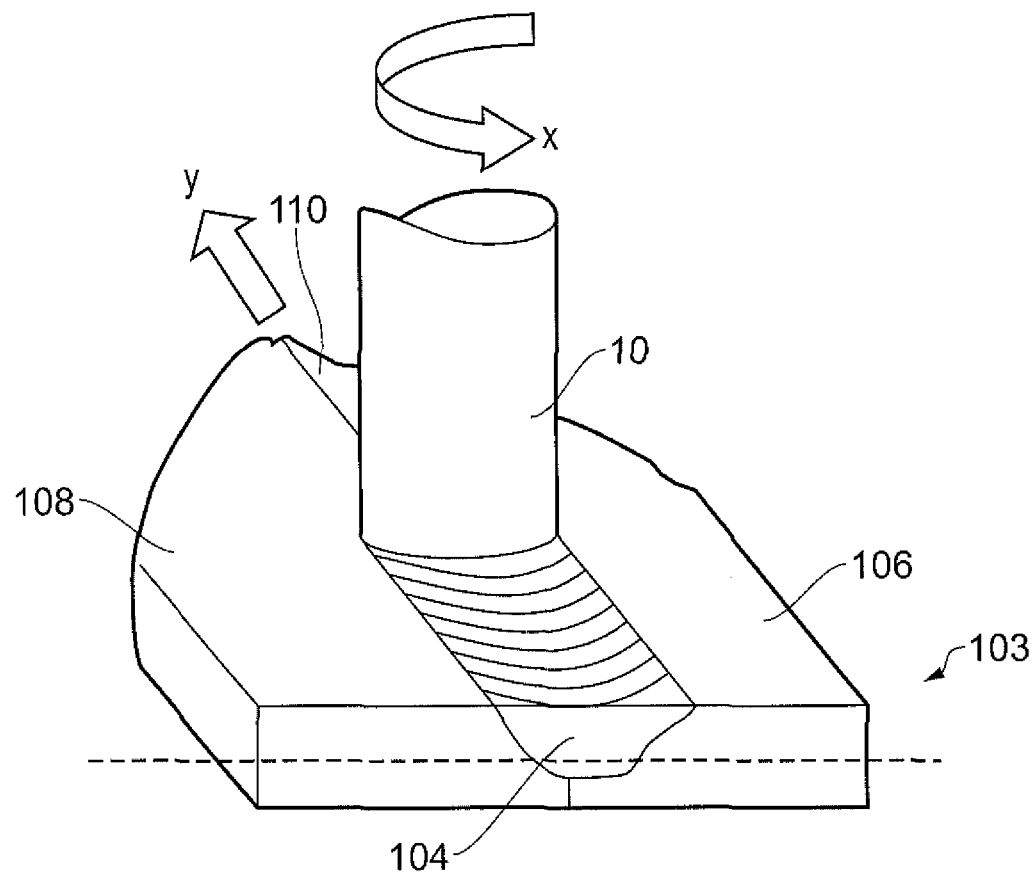
FIG. 3 shows part of a friction stir welding apparatus comprising the tool of FIG. 1.

FIG. 1 shows a friction stir welding tool 10 comprising a main body 12, a tool shoulder 14, and a probe 16. The friction stir welding tool 10 forms part of a friction stir welding apparatus 100, as shown in FIG. 3. The main body 12 of the tool 10 is generally cylindrical, and extends between a top end which is held by a chuck (not shown) in use, and the shoulder 14. The shoulder comprises a circular end face which contacts a surface of a workpiece 103 to be welded in use. The probe 16 extends below the shoulder 14. The probe 16 is generally cylindrical, having a smaller diameter than the main body 12 or the shoulder 14.

Figure 2:
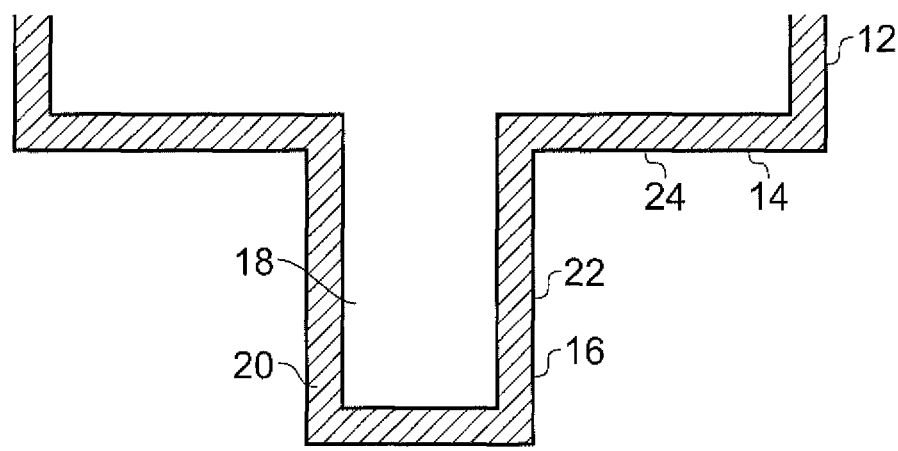
FIG. 2 shows a cross section of part of the tool of FIG. 1.

FIG. 2 shows a cross section through part of the tool 10. The main body 12, shoulder 14 and the probe 16 each comprise a core 18 comprising a ceramic material. Preferred ceramic materials include silicon nitride ($Si_3N_4$) and alumina ($Al_2O_3$). In one example, the silicon nitride is sintered to a density of 3.25 grams per cubic centimeter ($g/cm^3$). The resultant sintered silicon nitride ceramic core 18 has the following properties:

Weight: 13.23-13.24 g
Density: 3.21 grams per cubic centimeter
Volume: 4.12 cubic centimeters
Young's modulus: 310 Giga-Pascals
Poisson's ratio: 0.26
Max principle stress: 1220-1568 Mega-Pascals
Min principle stress: (−2461)-(−1700) Mega-Pascal
Shear stress: 953-1175 Mega-Pascal Ceramic materials such as silicon nitride in particular have been found to be resistant to abrasion and thermal shock during the welding process. Where the core 18 comprises silicon nitride, the core 18 may include a protective layer disposed between the core 18 and the coating 20. Suitable materials for the protective layer could comprise alumina, titanium carbide and titanium nitride. The protective layer could have a contrasting colour (such as yellow) compared to the core 18. Where the core 18 comprises silicon nitride, the core will generally be black. Consequently, a visual indication will be provided where the protective layer is worn away in any area of the tool 10.

Where alumina is used for the core 18, the alumina could contain additions of oxides of titanium, magnesium, chromium or zirconium or silicon-carbide grains distributed homogeneously throughout the alumina matrix to improve toughness. Other types of ceramic material could however be used to form the core 18, such as any of silicon carbide (SiC), Sialon (i.e. any ceramic alloy based on the elements silicon (Si), aluminium (Al), oxygen (O) and nitrogen (N)), ytrria ($Y_2O_3$), ceramic metal composites (Cermet), ceramic composites and reinforced ceramic composites. For example, the ceramic material composite could comprise alumina or silicon carbide reinforcing fibres.

The tool 10 further comprises a coating 20 comprising a metallic material. The metallic material coating 20 covers at least a "contact zone" of the tool, i.e. the parts of the tool 10 which contact the workpiece 103 in use to form the weld. Consequently, at least part of the probe 16 is covered with the coating 20. Additionally, where an integral shoulder 14 which comes into contact with the workpiece 103 to form the weld is provided, the shoulder 14 is also generally coated. The main body 12 may also be coated by the coating 20.

The coating 20 could comprise titanium (as in the described specific embodiment), though other metallic materials such as (but not exclusively) copper, nickel, steel, and aluminium, or alloys thereof. More generally, the metallic material is a thermally conducting, malleable, ductile material.

The coating 20 is provided in a substantially uniform layer having a thickness of approximately 1 to 1000 microns. In practice, a wide range of thicknesses has been found to be effective in the invention, though a thickness of between 100 and 1000 microns has been found to be particularly effective. The coating on the shoulder 14 and the probe 16 provide workpiece contact surfaces 22, 24. The workpiece contact surfaces contact the surface of the workpiece during welding, as explained below, and are polished such that they have a smooth surface finish (i.e. there are no surface features higher than approximately 5 microns from a nominal surface). The coating 20 could be applied to the core 18 as a single piece insert and bonded to the core 18, or could be applied by spray coating or vacuum plasma spraying for example. A bonding layer may be provided between the core 18 and the coating 20 to assist adhesion between the core 18 and coating 20, and to regulate differential thermal expansion. Further coating methods could include physical or chemical vapour deposition.

Referring to FIG. 3, part of a friction stir welding apparatus 100 is shown, which comprises the tool 10 and a workpiece 104. The workpiece 104 in this example comprises first and second components 106, 108 which are abutted to form a joint 110 therebetween. Alternatively, the first and second components 106, 108 could be overlapped to form a "lap joint". In a still further alternative, a single component could be welded. Both components 106, 108 comprise titanium alloy, though different materials can be welded using the invention. The apparatus 100 can be used to form a weld 102 in a target surface, known as a "weld zone" 104 of the workpiece 103 in accordance with the following method.

The tool 10 is attached to a chuck (not shown) with the contact surfaces 22, 24 of the probe 16 and the shoulder 14 facing the weld zone 104 of the workpiece 103. The tool 10 is initially rotated in a direction X at a distance from the weld zone 103 until the required rotational speed is obtained. Once the required rotational speed is obtained, the tool 10 is moved toward the weld zone 103 at a predefined speed. The probe 16 is forced into the workpiece 103 until the weld zone 104 contacts the contact surface 24 of the shoulder 14, i.e. the weld zone and contact zone meet. This initial step of moving the probe 16 into the workpiece 103 is known as the "plunge".

Once the contact surface 24 is in contact with the weld zone 104, the tool 10 is moved in a direction Y. Heat is generated by relative rotational movement between the contact surfaces 22, 24 and the weld zone 104, and the material in the weld zone 104 is thus upset, and a weld formed. During the welding process, it has been found that the material in the weld zone is heated to a temperature in the range 850° C. to 1275° C. The pressure applied during the welding process is generally within the range 35 to 110 kilo Newtons. Welding pressures and temperatures are typically highest during the plunge.

In prior arrangements, cracks in the tool may be formed during the plunge due to the thermal shock generated during this step. Such cracks may expand over a relatively short timeframe as the weld progresses, leading to immediate or eventual failure of the tool. By providing a metallic coating 20 which covers and thereby protects the contact zone of the ceramic material of the core 18, thermal shock of the tool 10 can be reduced, thereby increasing the life of the tool 10, and increasing the weld length relative to prior ceramic tools. The cost of the tool 10 is also substantially reduced relative to prior tools.

In the above described embodiment, both the metallic coating 20 of the tool 10 and the workpiece 103 comprise a titanium alloy. Titanium alloy can therefore be welded using the tool and method of the present invention. However, different materials could be used for the metallic coating 20 provided the coating 20 is physically compatible with the material of the workpiece 103, and is chemically compatible with the workpiece 103 and the ceramic of the core 18. That is to say, the coating 20 must not chemically react (such as bond adhere to, or combust) when exposed to the ceramic core 18 or the workpiece 103 at the temperatures at which the welding method is carried out, and the metallic coating 20 must not interfere with the quality of the weld, since in many cases some or all of the metallic coating will be "consumed" (i.e. mixed with the workpiece 103 in the welding zone 104 to form the weld) during the welding process. In the case of a titanium workpiece 103, a titanium coating has therefore been found to be suitable. Where workpieces comprising materials other than titanium are used, a coating comprising the same material as the workpiece is desirable. It is also desirable that the metallic coating is ductile, malleable, and sufficiently hard to withstand the plunge without being consumed too quickly, such that the ceramic core 18 is protected from heat and pressure in excess of the maximum heat and pressure that the ceramic can withstand during the plunge. The metallic coating should also be thermally conducting such that heat from the weld zone 103 is gradually transmitted to the core 18 to prevent thermal shock when the coating 20 is worn away.

Figure 4:
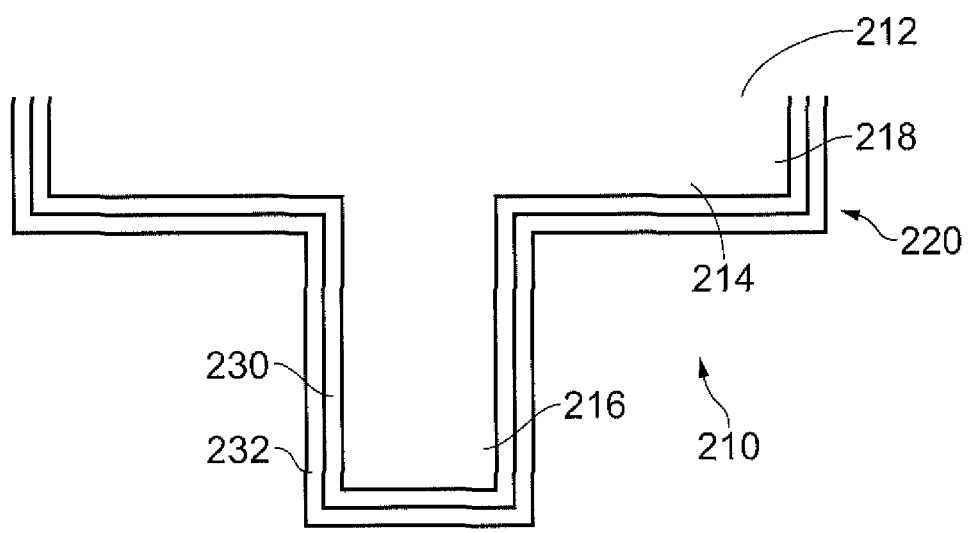
FIG. 4 shows part of a second friction stir welding tool.

FIG. 4 shows a second friction stir welding tool 210. The welding tool 210 is similar to the tool 10, and includes a main body 212, a shoulder 214 and a probe 216. The tool 210 comprises a ceramic core 218 and a metallic coating 220. However, the metallic coating 220 comprises inner and outer layers 230, 232. The inner layer 230 typically have a thickness of between 0.1 and 10 microns and comprises [(Ti, Zr) N] and or [(Ti,Al),N]. The outer layer 232 is harder than the inner layer 230, and could for example comprise Alumina layer. The outer layer 232 typically has an average thickness 0.1 to 5 microns. The outer layer 232 could be applied by chemical vapour deposition.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, although the above embodiments have been described in relation to friction stir welding, the invention could be used in other types of friction welding, such as linear or rotary friction welding.

The invention claimed is:

1. A friction welding tool comprising:
a probe comprising a ceramic material, the probe being manufactured with a surface coating consisting of a metal covering and bonded to at least part of a contact zone of the probe, the metallic coating comprising any of titanium copper, nickel and steel.

2. A tool according to claim 1, wherein
the ceramic material comprises any of alumina (Al2O3), silicon nitride (Si3N4), silicon carbide (SiC), Sialon, ytrria, ceramic metal composite (Cermet), Ceramic composite and reinforced ceramic composite.

3. A tool according to claim 1, wherein
the metallic coating is chemically compatible with the ceramic material.

4. A tool according to claim 1, wherein
the metallic coating has a thickness between 1 and 1000 microns.

5. A tool according to claim 1, wherein
the tool comprises a shoulder, the shoulder having a coating comprising the metallic material.

6. A tool according to claim 1, wherein
the metallic coating is applied by any of spray coating, vacuum plasma spraying.

7. A tool according to claim 1, wherein
the surface of the metallic coating is polished to provide a smooth contact surface.

8. A friction welding apparatus comprising a welding tool in accordance with claim 1 and a workpiece to be welded.

9. A friction welding apparatus according to claim 8, wherein
the workpiece comprises any of titanium, nickel, steel, magnesium, aluminium, nickel and alloys thereof.

10. A friction welding apparatus according to claim 8 wherein
the worpiece is formed of a metallic material of a same type as the metallic material covering the at least part of the contact zone of the probe.

11. A method of friction welding a workpiece comprising:
providing a workpiece comprising a workpiece material;
providing a in accordance with claim 1; and
friction welding the workpiece using the tool.

12. A method of friction welding according to claim 11, wherein
the method comprises any of friction stir welding, linear friction welding and rotational friction welding.

* * * * *